J. BECOTT.
GRAVITY CONCENTRATOR.
APPLICATION FILED SEPT. 14, 1916.
1,294,603.
Patented Feb. 18, 1919.
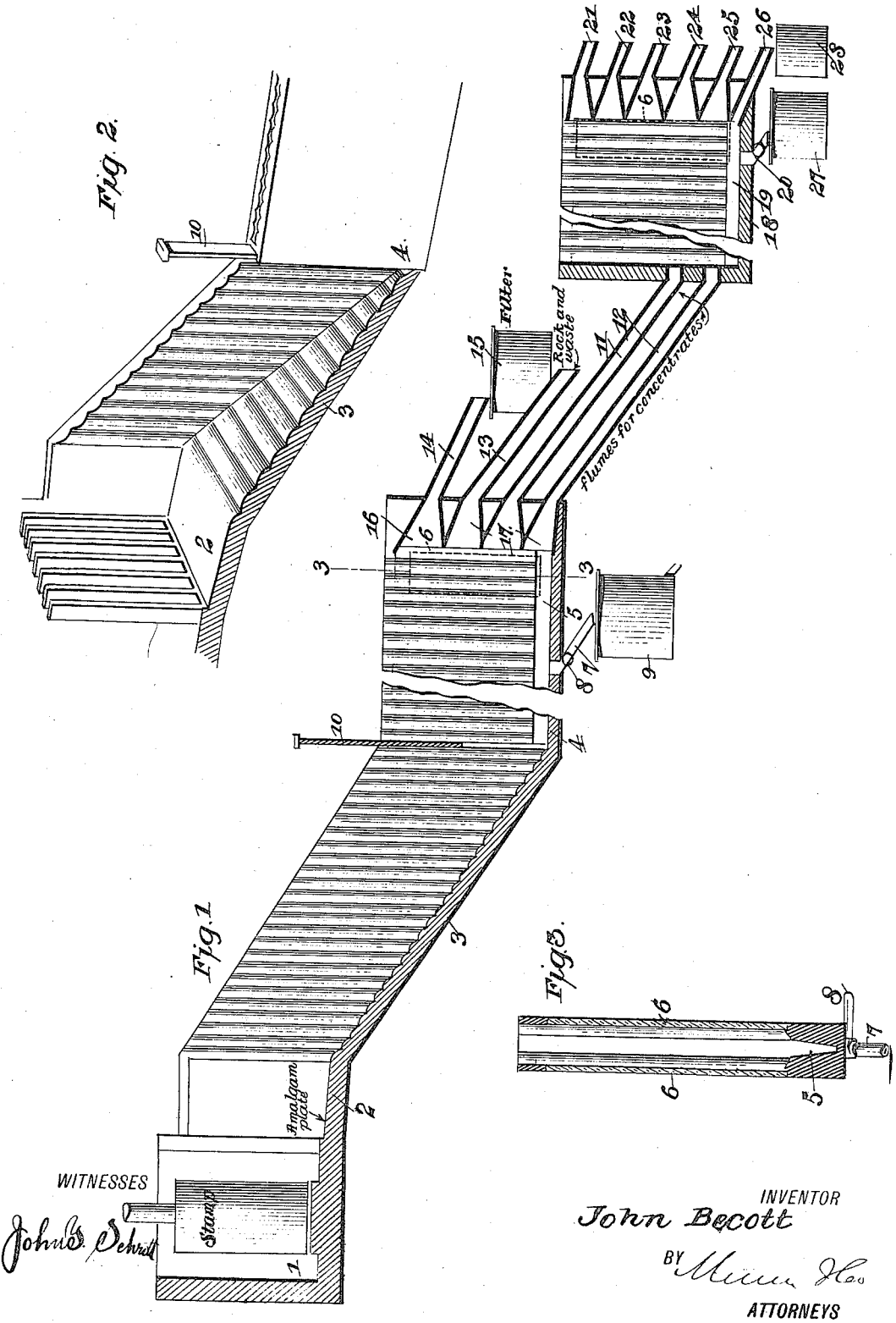
INVENTOR
John Becott
BY
ATTORNEYS

UNITED STATES PATENT OFFICE.

JOHN BECOTT, OF DURANGO, COLORADO.

GRAVITY-CONCENTRATOR.

1,294,603.　　　　Specification of Letters Patent.　　Patented Feb. 18, 1919.

Application filed September 14, 1916.　Serial No. 119,999.

*To all whom it may concern:*

Be it known that I, JOHN BECOTT, a citizen of the United States, and a resident of Durango, in the county of La Plata and State of Colorado, have invented a certain new and useful Improvement in Gravity-Concentrators, of which the following is a specification.

My invention is an improvement in gravity ore concentrators, and has for its object to provide a concentrator of the character specified wherein a series of gravity concentrators is provided arranged to hold the concentrates in water in a narrow deep trough in order that a thin vertical layer may be obtained and having means for retarding the flow of the concentrates to permit them to settle by gravity, and wherein mechanism is provided in connection with each trough for drawing off the minerals at the different levels upon which they settle.

In the drawings:

Figure 1 is a longitudinal section;

Fig. 2 is a partial perspective view, and

Fig. 3 is a section on the line 3—3 of Fig. 1.

The present embodiment of the invention is shown in connection with a pulverizer indicated generally at 1, and in the present instance a set of stamps, and the crude ore, after being pulverized, passes over an amalgamating plate 2 in order that any gold freed by the pulverizer may be caught at this point. Leaving the amalgamator plate, the ore passes through a connecting flume 3 of triangular shape and inclined as shown, the said flume gradually decreasing in width from the amalgamator plate to the first gravity trough and the bottom and side walls of the flume are corrugated as shown.

The first gravity trough, indicated at 4, is narrow and deep, the trough in practice being approximately thirty-six inches in depth and of any desired length and with a channel of one-half inch approximately. The side walls of the gravity trough are corrugated as shown, and in the bottom of the trough is a channel indicated at 5 of approximately V-shape.

Glass panels 6 are let into the side walls of the trough near the end remote from the feed flume, and these panels extend from near the top of the trough to near the bottom of the corrugations, stopping just above the side walls of the V-shaped channel 5. These glass plates permit inspection of the material flowing through the gravity trough just before it passes from the trough. An outlet 7 is provided in the bottom of the trough, that is, in the bottom of the channel, and this outlet is valve controlled, the valve being indicated at 8. The outlet delivers to a suitable container 9 and any heavy material that may be in the bottom of the trough is drawn off and delivered to the bullion tank or the container 9, the outlets at 7, the valves or gates at 8, and containers 9 to be as many as desired. A gate 10 is provided at the inlet end of the gravity trough, the said gate moving in guides as shown, and being arranged to cut off communication between the feed flume and the gravity trough.

The concentrates leaving the first gravity trough pass through flumes 11 and 12 to the second trough to be described, while the rock and waste passes out through the flume 13. The light or floating minerals are drawn off through a flume 14 into a filter 15 and a skimmer or gate 16 is provided in connection with flume 14 for cutting off the top layer of the liquid, holding the light or floating suspended mineral in the gravity tank and constraining it to flow through the flume 14. Gates or skimmers 17 are also provided for the flumes 13 and 11 and the flume 12 opens at the bottom of the V-shaped channel 5. The second trough 18 is similar to the trough 4, having the V-shaped channel 19 in its bottom and the corrugated side walls, and the said trough has an outlet 20 in its bottom for the heavy minerals that may settle to the V-shaped trough.

Flumes 21, 22, 23, 24, 25, and 26 are provided at the outlet end of the gravity trough. The flume 21 is at the top and is for the light metals; the flume 22 is for zinc; the flume 23 for lead; the flume 24 for copper; the flume 25 for silver, and the flume 26 for gold and other heavy minerals.

Suitable containers 27 and 28 are arranged below the outlet 20 and the flume 26 respectively, and other suitable receivers will be provided in connection with flumes 21 to 25 inclusive.

In operation the pulverized ore passes from the stamps over the amalgamator plate which takes up any free gold and from thence the material passes down the feed flume 3 to the first gravity trough. Here the solution is held in a thin vertical layer and the flow is retarded, permitting the minerals held by the solution to separate according to their various specific gravities, and they pass from the first trough to the second trough, the light material being recovered by a filter while the rock and waste are discharged. The concentrates pass into the second trough where they are separated into various minerals, and it will be understood that as many gravity troughs may be provided as may be found desirable or necessary.

It will be understood that the concentrator may be used in placer mining and with tailings from mills, by placing suitable screens in the place of the stamps.

I claim:—

In a gravity concentrator, a gravity trough of relatively great depth and relatively small width and having corrugations in the side walls, the corrugations being vertical and being near the corrugations of the opposite side walls to constrict the flow of the water and concentrates, said trough having in its bottom a substantially V-shaped passage extending the full length thereof and having its side walls flush with the apices of the corrugations.

JOHN BECOTT.

Witnessed by—
 HENRY G. BERRI,
 SILAS W. SMITH.